Aug. 11, 1925.

W. A. GREENWALT

COVER FOR COOKING UTENSILS

Filed Nov. 20, 1924

1,549,412

Inventor
W. A. Greenwalt,
By Clarence A. O'Brien
Attorney

Patented Aug. 11, 1925.

1,549,412

UNITED STATES PATENT OFFICE.

WILLIAM A. GREENWALT, OF TAMPA, FLORIDA.

COVER FOR COOKING UTENSILS.

Application filed November 20, 1924. Serial No. 751,050.

*To all whom it may concern:*

Be it known that I, WILLIAM A. GREENWALT, a citizen of the United States, residing at Tampa, in the county of Hillsborough and State of Florida, have invented certain new and useful Improvements in Covers for Cooking Utensils, of which the following is a specification.

This invention relates to improvements in covers for cooking utensils, and has for its principal object to provide a simple and efficient device, which will prevent the cover from becoming unseated from the top of the cooking utensil, yet permitting the steam to escape from the cooking utensil.

A further object of the invention is to provide a cover of the above mentioned character which will prevent hot grease from splattering upwardly from a frying pan, yet permitting steam to escape from the pan, thus eliminating any possibility of the food in the frying pan becoming soggy, such as frequently happens with the ordinary covers now in use.

A further object of the invention is to provide a cover of the above mentioned character, which is simple in construction, inexpensive, strong and durable, and further well adapted for the purposes for which it is designated.

Other objects and advantages of this invention will become apparent during the course of the following description.

Figure 1:
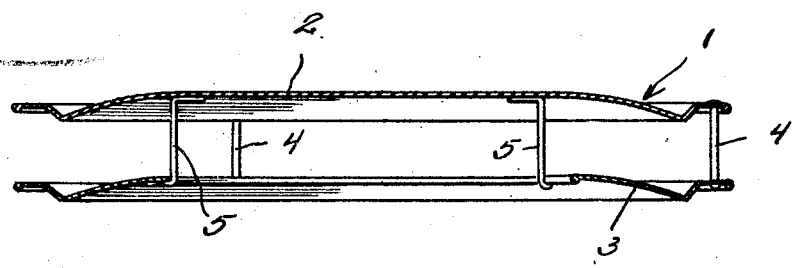
Figure 2:
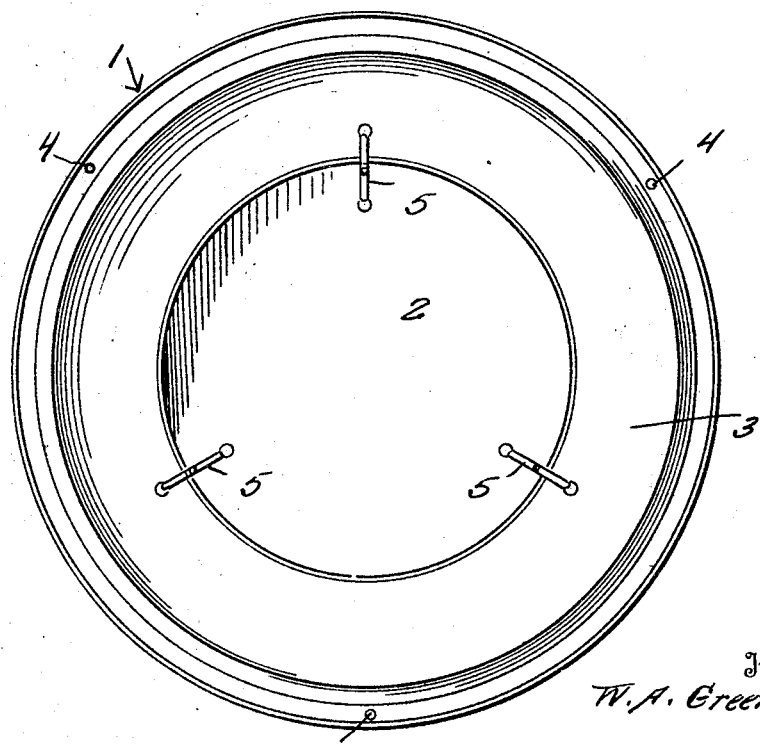

In the accompanying drawing, forming a part of this specification, and in which like numerals designate like parts throughout the same:

Figure 1 is a cross sectional view, through the cover embodying my invention, and Figure 2 is a bottom plan view thereof.

In the drawing, wherein for the purpose of illustration is shown the embodiment of my invention, the numeral 1 designates generally my improved cover, and the same includes the top section 2, which is preferably in the form of a disc, such as is commonly used in the covers for cooking utensils well known in the art. The bottom section 3 is preferably in the form of a ring, and the same is supported in spaced relation with respect to the top section 2, by means of the spacing pins 4, which are arranged adjacent the outer peripheral edges of the top and bottom sections, and the spacing members 5, which extend between the inner peripheral edge of the ring 3 and the adjacent portion of the top section 2. It is of course to be understood that the top section 2 is provided with any suitable handle for facilitating the handling of the same.

When in use, the ring like bottom section 3 will rest on the top of the cooking receptacle, whereby the top section 2 will be spaced from the receptacle to provide a means whereby the steam generated in the receptacle will escape outwardly therefrom between the sections of the cover, and at the same time prevent any hot grease, when the cover is placed over a frying pan, from splattering upwardly and coming in contact with a person standing nearby. Furthermore, the provision of a cover of the above mentioned character will prevent the displacement of the same from a cooking receptacle, such as frequently occurs when the boiling point is reached.

While I have shown the preferred embodiment of my invention, it is to be understood that various changes in the size, shape, and arrangement of parts may be resorted to, without departing from the spirit of the invention and the scope of the appended claim.

Having thus described my invention, what I claim is:

In combination, a cover, a ring, a plurality of spacing pins between the cover and the ring at their outer peripheries, and a plurality of spacing pins adjacent the inner periphery of the ring and attached to the cover.

In testimony whereof I affix my signature.

WILLIAM A. GREENWALT.